United States Patent [19]
Knobel et al.

[11] Patent Number: 5,916,929
[45] Date of Patent: Jun. 29, 1999

[54] METHOD FOR IRRADIATING ORGANIC POLYMERS

[75] Inventors: Thomas Knobel, Princeton, N.J.; Paul R. Minbiole, Northport, N.Y.

[73] Assignee: E-Beam Services, Inc., Cranbury, N.J.

[21] Appl. No.: 08/880,339

[22] Filed: Jun. 23, 1997

[51] Int. Cl.⁶ .................................................. C08J 3/28
[52] U.S. Cl. ........................ 522/155; 522/157; 522/156; 522/161; 522/164; 522/158; 522/159; 522/3; 522/150; 522/162
[58] Field of Search .............................. 522/3, 157, 161, 522/164, 155, 156, 158, 159, 150, 162

[56] References Cited

U.S. PATENT DOCUMENTS

| | | | |
|---|---|---|---|
| 3,330,748 | 7/1967 | Lawton | 522/3 |
| 3,766,031 | 10/1973 | Dillon | 204/159.2 |
| 3,862,265 | 1/1975 | Steinkamp et al. | 206/878 R |
| 4,748,005 | 5/1988 | Neuberg et al. | 522/3 |
| 5,414,027 | 5/1995 | DeNicok, Jr. et al. | 522/157 |
| 5,508,318 | 4/1996 | Comer | 522/157 |
| 5,578,682 | 11/1996 | White | 525/285 |

*Primary Examiner*—Susan W. Berman
*Attorney, Agent, or Firm*—John Lezdey & Assoc.

[57] ABSTRACT

A method for irradiating and modifying high molecular weight organic polymers with high energy radiation so that the radiation impinges only in a distinct pattern which is less than the width of the polymer so as to cause controlled chain scission and continuity in molecular weight distribution. The method improves the flow rate and millability of the polymers.

18 Claims, 3 Drawing Sheets

PRIOR ART

METHOD FOR IRRADIATING ORGANIC POLYMERS

FIELD OF THE INVENTION

This invention relates to a method of more efficiently irradiating and modifying high molecular weight solid organic polymers with high energy radiation to improve various physical and mechanical properties. More particularly, this invention relates to a more efficient method to improve the processing properties, e.g., millability and melt flow rate of the irradiated polymer.

DESCRIPTION OF THE PRIOR ART

It has been well known that polymeric substances are modified when subjected to bombardment with high energy, ionizing radiation including accelerated charged particles, such as electrons and protons and particles emitted by nuclear processes. In general irradiation of polymer materials yields two types of substantially different products. Some high polymers such as polyethylene and its copolymers, polybutadiene, polyvinylchloride, natural rubber, polyamides, polycarbonamides and polyesters, undergo molecular combination and eventually become crosslinked. Crosslinking essentially increases the molecular weight of a polymer and increases its melt viscosity as measured by the melt flow rate, i.e., the numerical value of the melt flow rate decreases. A second class of polymers such as polypropylene, polyvinylidene chloride and fluorocarbon polymers including polytetrafluoroethylene are known to undergo polymer degradation when irradiated with high energy ionizing radiation. This chain scissioning tends to decrease the molecular weight of the polymer which is reflected by a decrease in the melt viscosity properties as measured by an increase in the melt flow rate (MFR).

Thus, the prior art practice of providing uniform dosage produces substantial degradation and forms low molecular weight products when organic polymers such as polypropylene, polyvinylidene chloride, polychlorotrifluoroethylene and polytetrafluoroethylene are subjected to chain scissioning radiation. The degradation of the polymer affects such important physical properties such as elongation, tensile strength and toughness and processing properties such as in milling or in extruding.

In the prior art, a process disclosing a tray irradiation technique is disclosed in U.S. Pat. No. 3,766,031 to Dillon, which is incorporated herein by reference. Inefficiencies in this potential process are due to the overscan of the trays, usually there is some space between the trays and the penetration characteristics (depth-dose) of the electron beam. The overscan by radiation involves an efficiency loss of about 5 to 15 percent. Further, the gap between the trays causes a 10 to 15 percent loss of efficiency. However, the largest efficiency loss arises out of the fact that the dose received by the material varies when the dose at the surface is taken as the nominal dose for the material. Beam energy and/or material depth is adjusted so that the equal dose is effected at the opposite surface of the material. Radiation in excess of the nominal dose and the radiation that passes entirely through the material is not utilized. This inefficiency, i.e., the depth-dose characteristic can cause processing inefficiency of around 50 percent in some instances may result in undesired properties of the resulting product.

The prior art technique of scission irradiation by high energy radiation to reduce the molecular weight of the material is inefficient with the degraded product having inconsistent properties. Furthermore, extrusion grade polymers irradiated by prior art techniques can only be processed at modest extrusion rates.

SUMMARY OF THE INVENTION

In accordance with the present invention there is provided a method for the radiation processing of solid high molecular weight polymers to degrade the polymer to a lower molecular weight and provide a polymer product which is more easily comminuted into micropowders. The resulting irradiated polymers have a wider molecular weight distribution and a higher melt-flow rate (MFR) than those of the prior art processes. These improved physical properties translate into an increased melt strength which results in faster extrusion rates for applications such as melt spinning non-woven fibers, as well as, improving the grindability of the irradiated material into micropowders and particularly in the case of fluoropolymers.

The crux of the present invention involves under-scanning the polymer material through a zone of irradiation with maximum efficiency of an electron beam and after at least one pass yields a non-uniform irradiated product. More particularly, the present invention relates to a process for irradiating a solid high molecular weight organic polymer in a flowable solid form such as chips, pellets or powders with high energy electrons so as to utilize more efficiently such radiation to obtain a distinct radiation pattern (sweet spot) to impinge the polymer. The resulting polymer material is characterized by continuity in molecular weight distribution.

In a preferred embodiment the method comprises the steps of:

(a) providing in a flowable solid form an organic polymer in a substantially uniform depth across a width greater than the pattern of the radiation beam wherein said depth exceeds the penetration potential of electrons;

(b) passing said flowable solid organic polymer through the irradiation zone; and (c) irradiating said polymer so that the radiation impinges only upon a central portion across the width of said polymer but not to penetrate the entire depth of the polymer layer.

Advantageously for obtaining greater uniformity, the process includes the further steps of:

removing the flowable solid from the irradiation zone;

mixing the irradiated and unirradiated forms of the polymer;

reintroducing at least once said mixed irradiated and unirradiated polymer through the irradiation zone; and recovering an organic polymer having improved melt flow characteristics.

Preferably, the flowable solid form of the organic polymer is selected from chips, granules, pellets or powders. The preferred polymers are polypropylene and polytetrafluoroethylene.

The method according to this invention is energy efficient in that the electron irradiation is essentially completely absorbed in the flowable solid form of the organic polymer. The quality of the product can be controlled by inspection or sampling after passage through the irradiation zone.

It is therefore an object of this invention to degrade solid high molecular weight organic polymers by radiation of high energy radiation to produce irradiated polymers which have a broader and a more continuous or level distribution of molecular weight with improved melt flow rate values and/or millability.

Another object of this invention is to use high energy sources more efficiently, particularly in the use of the electron beam.

A further object of this invention is to provide electron beam scanning which produces a linear distribution of the electron beam in depth to improve the depth-dose characteristics of the method.

A still further object of this invention is to provide polypropylene granules, pellets or powders having polydispersity and improved melt flow rate values.

Yet another object of the invention is to provide an irradiation method which produces a polytetrafluoroethylene to render the material more readily grindable to fine powder with improved melt flow rate values.

Other and further objects of this invention will be apparent from the drawings and the following detailed description thereof which is set forth for the purposes of explaining the invention and is not regarded as necessarily limiting the scope of the invention, which is defined in the appended claims.

DESCRIPTION OF THE PREFERRED EMBODIMENTS

According to the present invention, the efficiency of irradiating organic polymers which are capable of undergoing controlled chain scission when subjected to radiation by underscanning with high energy electrons is greatly improved. It is another consequence of the present invention that solid high molecular weight organic polymers, which undergo chain scissioning under irradiation, have improved melt flow characteristics which translate into improved processing properties. These properties include irradiated polymers which are more readily communitable into fine powders or can be extruded at higher speeds at lower costs. Surprisingly, it has been found that the advantages pointed out above are attained by providing the organic polymer in flowable solid form preferably as chips, granules, pellets or powders in a substantially uniform depth across a width greater than the pattern of the radiation beam wherein this depth exceeds the penetration potential of electrons. The high energy particles penetrate the polymers to a limited depth which is dependent upon the particular energy level of the electrons employed and upon the density of the irradiated polymer.

Generally, it is desired to assure passage of the electrons all the way through the sample. Heretofore, there was no need for limiting the depth of the pellets or powders since a more uniform irradiated product is desired which involves such penetration which pass entirely through the depth of the pellets or powders which involves wasteful radiation.

A convenient method for practicing the invention is to conduct the organic polymer in the form of pellets or powders at a constant rate through a beam of high energy ionizing radiation. The ionizing radiation used to produce the irradiated polymer that constitutes the starting material for the process of the present invention should have sufficient energy to penetrate to the extent desired. The energy must be sufficient to ionize the molecular structure and to excite atomic structure. The ionizing radiation can be of any kind, but most practical type comprise electrons and gamma rays. Preferred are electrons beamed from an electron generator having an acceleration potential of about 0.1 to 10 megavolts (Mev), preferably 1.0 to 10.0 megavolts, delivered generally at a dose rate of about 0.5 to about 150 megarads per minute. For example, in the case of a propylene polymer material satisfactory results are obtained with a dose of about 0.1 megarad to about 1.0 megarads, delivered at the foregoing dose rates. For polytetrafluoroethylene a dose of about 0.1 megarad to about 300 megarads, preferably about 10 megarad to about 200 megarads would be effective.

Figure 2:
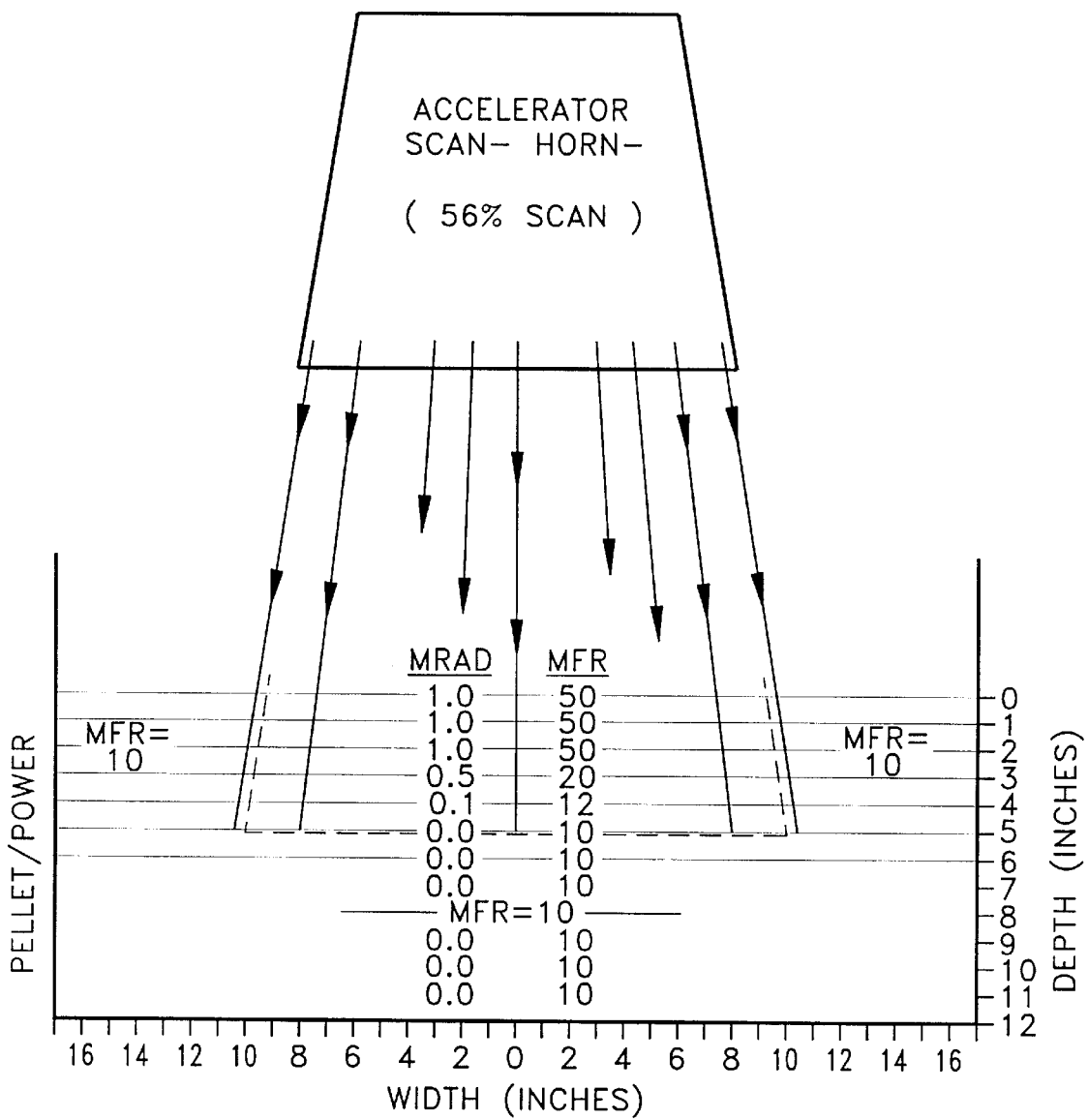
FIG. 2 is a graphic illustration of the typical electron penetration depth and accelerator scan width.

The term "rad" is usually defined as that quantity of ionizing radiation that results in the absorption of 100 ergs of energy per gram of irradiated material, regardless of the source of radiation. At 1 Kw, the maximum dose rate is about 0.5 Mrads/min. and at 300Kw, the maximum dose rate is about 150 Mrads/min. In the practice of this process, it is essential that the proper beam width be used to correspond to the distance from the radiation source to the specimen at which the irradiation is to be carried out, or conversely that the optimum source distance be employed for the width of the beam. The center portion of the beam has the highest radiation intensity as shown in FIG. 2.

A preferred manner of carrying out the invention comprises an endless conveyor equipped with a plurality of trays, which are shaped in the form of rectangular bucket type containers in which pellets or powders are placed at a predetermined depth. The conveyor is generally horizontally disposed and continuously travels under predetermined speed through the radiation chamber and extends into a safe chamber where the irradiated product can be inspected or sampled. The predetermined depth of the bed of pellets or powders exceeds the penetration potential of the electrons. The speed of travel of the conveyor is selected so that the layer of pellets or powders passes through the beam or beams of ionizing radiation at a rate to receive the desired dose of ionizing radiation using multiple passes to accumulate a dose.

An electron beam generator of conventional design and operation is employed. The Van de Graaff electron generator provides a particularly convenient source of a beam of accelerated electrons of a controllable voltage and current. Therefore, it has been employed in the examples to illustrate the present invention without any purpose to limit the invention either to this type of high energy particle or to the Van de Graaff generator as the source of electrons. Under operating conditions, the electron beam generator emits a controlled narrow beam of high energy directed to particles of polymer material in the trays. Generally, the beam width is limited to about 30 to 95 percent of the tray width and preferably from about 50 to 80 percent to underscan the polymer material. After passing through the radiation zone, the trays carried by the conveyor exit into a safe chamber where the irradiated polymer material may be visually inspected or sampled. The irradiated product can be subjected to additional processing, for example, a heating step, a cooling step, or a combination of steps. The product may then be reintroduced into the radiation zone until the target pellets or powders receive the desired dose of radiation. The irradiated polymer material is discharged from the conveyor and transferred to a holding vessel for further processing. Prior to such further processing, e.g., comminution, extrusion or melt compounding, the irradiated polymer material can be blended with other polymers, if desired, and additives, such as stabilizers, pigments, fillers and the like.

The method of this invention is economically efficient in that it is not constrained to batch operation and can have a continuous feed. In a continuous process, the individual trays are loaded from a conveyor feed, passed under an electron beam and/or subsequently passed through an air circulating oven at a speed such the material is subjected to the desired heat for a predetermined time period. The irradiated polymer passes into a communitor, the grinded particles are classified and collected.

Alternatively, the irradiated polymer is discharged from the trays and conveyed in the required environment to a holding vessel, the interior of which has the required environment. The irradiated material is then introduced into an extruder operated at a melt temperature of the irradiated material or is introduced into a heated, inert gas fluidized bed or a staged system of fluidized beds, of irradiated polymer particles and after quenching is discharged into the atmosphere.

The irradiated polymer products produced by the method of this invention surprisingly have an excellent melt flow behavior, which is due to its broad molecular weight distribution. The excellent melt flow characteristics of the polymers of this invention may be gauged by determining the critical shear stress, i.e., critical shear rate at which melt fracture will occur.

The melt flow rate is determined by ASTM Method D1238, Condition L and the density of the polymer is measured by ASTM D 792 A-2.

The term "organic polymer" is intended to include solid high molecular weight organic compositions capable of undergoing chain scission when subjected to high energy radiation, for instance high energy electrons in order to modify the properties of the organic polymer is an advantageous and desirable manner. Among such polymers include polypropylene, polyamides, polyvinylidene chloride and fluorocarbon polymers selected from homopolymers and copolymers of polyvinylidene fluoride, polychlorotrifluoroethylene, polytrifluorethylene, polytetrafluorethylene, polypentafluoropropene and polyhexafluoropropane.

The following example, presented for illustrative purposes, describe preferred embodiments of the present process.

EXAMPLE

Figure 1:
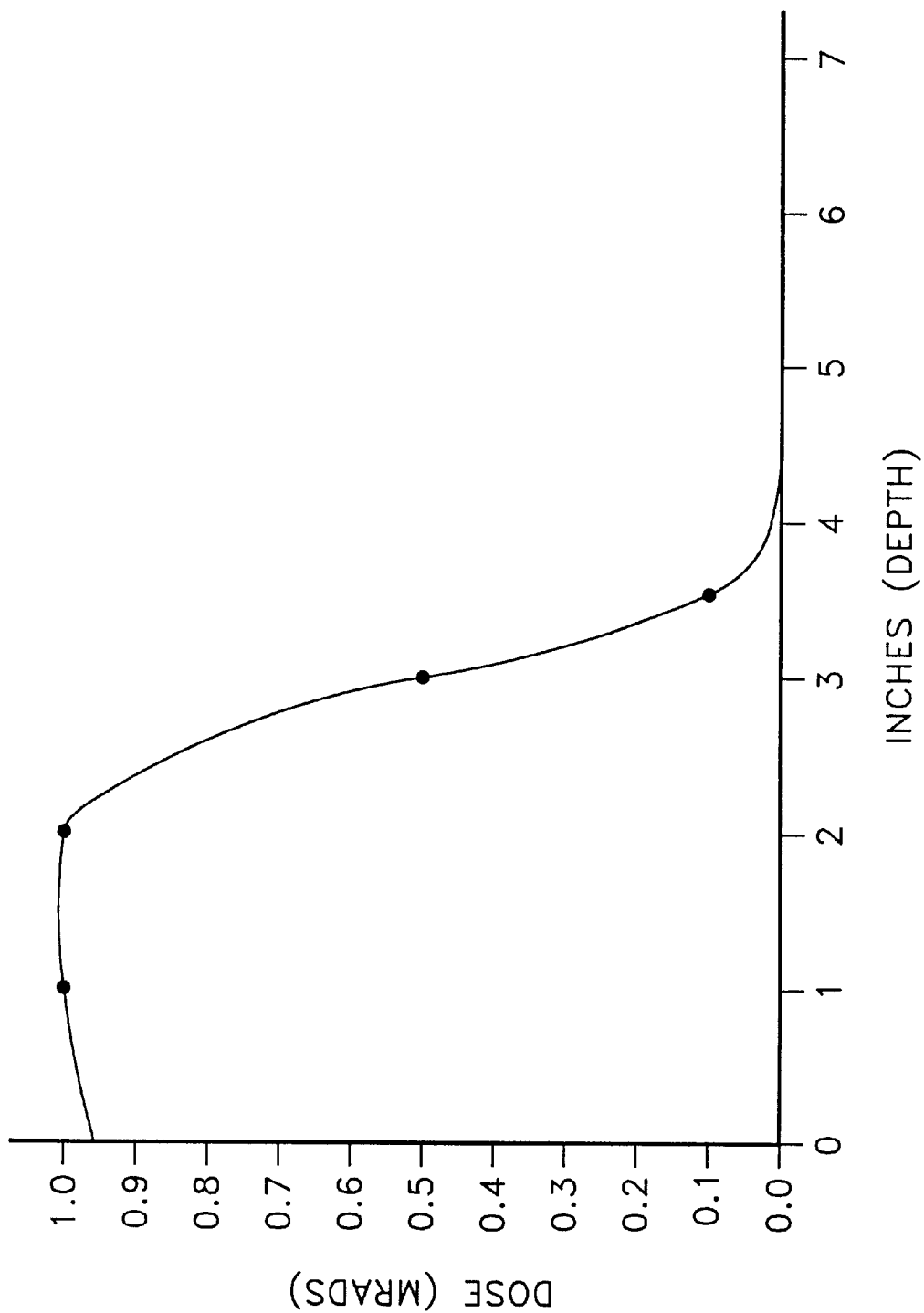
FIG. 1 is a graphic illustration of a depth/dose profile for irradiated polypropylene.

A pelletized-high-molecular weight-linear polyprolyene was charged into a plurality of trays carried by an endless conveyor. Each tray having the dimensions 34 inches long, 10 inches wide and 12 inches deep. The trays are passed by the conveyor into a radiation chamber and through an electron beam generated by 4.5 MeV generator operating at a 15 milliamps beam current with a scanned beam width of about 9.5 inches or about 56 percent scan at the top surface of the tray. The linear velocity of the conveyor was adjusted to provide a desired depth-dose where the electron beam is essentially absorbed in the top 5 inches polymer in the tray. This is illustrated in FIG. 2. This depth-dose characteristic is (prototypically) shown in FIG. 1 and illustrates that the amount of radiation absorbed by the polymer is directly proportional to the depth of the polymer.

After the initial pass through the irradiation zone the irradiated and unirradiated polymers were randomly mixed and reintroduced into the radiation chamber and subjected to the same dosage. Several more passes through the radiation zone may be required. However, in this example after the second pass the trays were emptied and the polymer was subjected to a melt flow rate test by ASTM, Method D-1238 and density by ASTM D 792 A-2.

According to the underscanning method of the present invention (after one pass) the composite melt flow rate value is shown to be increased from the nominal value of 10 to a value of 14.36.

TABLE 1

| DEPTH (inches) | CROSS SECTION IRRADIATED | AREA OF SEGMENT IRRADIATED (in$^2$) | POLYMER FRACTION IN AREA SEGMENT IRRADIATED | MFR AT DEPTH | MFR OF POLYMER FRACTION |
|---|---|---|---|---|---|
| 0–1 | 9.5" × 2" | 19.0 | 0.0466 | 50 | 2.33 |
| 1–2 | 9.75" × 2" | 19.5 | 0.0478 | 50 | 2.39 |
| 2–3 | 10.0" × 2" | 20.0 | 0.0490 | 20 | 0.98 |
| 3–4 | 10.25" × 2" | 20.5 | 0.0502 | 12 | 0.60 |
| 4–5 | 10.50" × 2" | 21.0 | 0.0515 | 10 | 0.52 |
| 6 | 0 | 0 | Balance of Polymer in Unirradiated | 10 | |
| 7 | 0 | 0 | | 10 | |
| 8 | 0 | 0 | | 10 | |
| 9 | 0 | 0 | 0.7549 | 10 | 7.54 |
| 10 | 0 | 0 | | 10 | |
| 11 | 0 | 0 | | 10 | |
| 12 | 0 | 0 | | 10 | |
| TOTAL CROSS SECTIONAL AREA = 408 in$^2$ = 12" × 34" | | | | COMPOSITE MFR | 14.36 |

Figure 3:
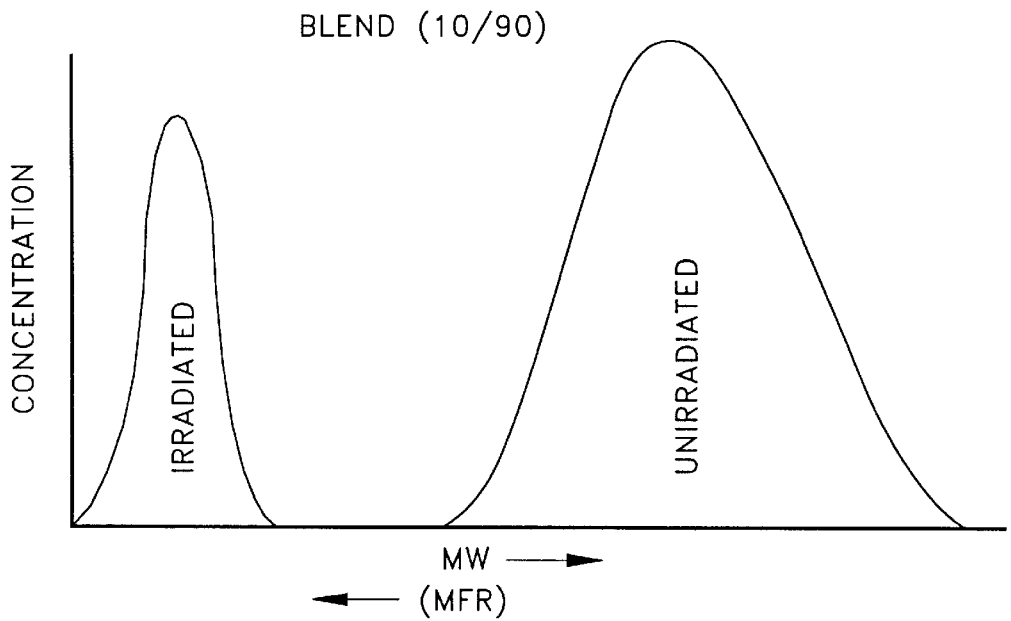
FIG. 3 graphically illustrates a prior art 10/90 blend of irradiated and unirradiated polymer.
Figure 4:
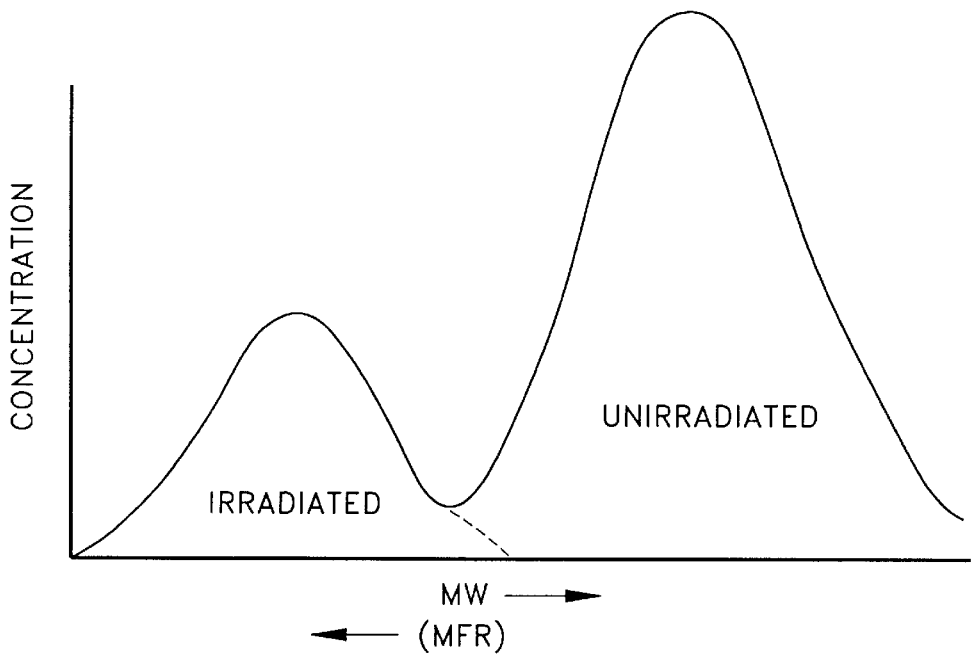
FIG. 4 graphically illustrates a further polymer blend of the invention.

FIGS. 3 and 4 compare the molecular weight distribution of a 10/90 blend of irradiated and unirradiated polypropylene between the method of this invention and the prior art. In FIG. 3 the prior art shows a bimodal molecular weigh distribution with a low molecular weight spike of irradiated polymer and a larger high molecular weight spike. The integrated area under the high molecular weight spike is generally about seventy percent (70 w) of the total areas. Thus, the prior art has a distinct bimodal arrangement. Bimodal materials are generally difficult to blend since two materials with significantly different melt flow rates cannot be readily dispersed even during extrusion. The polymer irradiated by the method of this invention as shown in FIG. 4 illustrates a more uniform and broader distribution of molecular weight without distinct spikes. This has been found to be particularly desirable for good melt processing characteristics at high shear rates with blended polymers.

The propylene polymer material produced according to this invention can be converted into useful products by extrusion coating including fabric coating, wire and cable coating, melt extrusion, sheet extrusion and coextrusion; profile extrusion, spinning operations to produce fibers, such as melt spinning melt blowing and spun bonding operations to produce fibers, stretching, uniaxially or biaxially, to form film including heat shrinkable film, strapping and slit-tape film. The irradiated propylene polymer material of this invention can also be blended with normally solid, isotactic, semi-crystalline, linear propylene polymer materials and with other polymeric materials.

Other features, advantages, and embodiments of the invention disclosed herein will be readily apparent to those exercising ordinary skill after reading the foregoing disclosures. In this regard while specific embodiments of the invention have been described in considerable detail variations and modifications of these embodiments can be effected without departing from the spirit and scope of the invention as described and claimed.

What is claimed is:

1. A method for irradiating a high molecular weight organic polymer in flowable solid form which is capable of undergoing chain scission when subjected to radiation with high energy electrons so as to utilize more efficiently said radiation to a impinge the polymer with a distinct radiation pattern to provide continuity in molecular weight distribution comprising the steps of:

(a) forming a bed of an organic polymer in flowable solid form, said bed having a substantially uniform depth which exceeds the penetration potential of the electrons and a width greater than the pattern of the radiation beam;

(b) passing said bed of organic polymer through a radiation zone providing a radiation beam narrower than the width of said bed of organic polymer;

(c) irradiating said bed of organic polymer so that the radiation impinges only in a distinct pattern which is less than the total width of said bed of organic polymer at an intensity sufficient to cause controlled chain scission of said polymer but not of sufficient intensity to penetrate the entire depth of the organic polymer to provide irradiated and non-irradiated polymer;

(d) removing said irradiated and non-irradiated organic polymer from said radiation zone;

(e) mixing the irradiated and non-irradiated polymer; and (f) recovering an organic polymer having a continuous distribution of a decreased molecular weight with an increased melt flow rate.

2. The method of claim 1 wherein said flowable solid form is selected from chips, granules, pellets or powders.

3. The method of claim 2 wherein said flowable solid form is pellets or powders.

4. The method of claim 1 or 2 wherein a portion of the organic polymer is removed before or after step (e) for sampling.

5. The method of claim 2 wherein said organic polymer is reintroduced repeatedly until the desired amount of radiation is absorbed.

6. The method of claim 1 wherein said radiation pattern impinges only upon a central portion of the total width of the organic polymer.

7. The method of claim 1 wherein said organic polymer, homopolymers and copolymers are selected from polypropylene, polyamide, polyvinylidene chloride and fluorocarbon polymers.

8. The method of claim 7 wherein said fluorocarbon polymers are selected from polyvinylidene fluoride, polychlorotrifluoroethylene, polytrifluoroethylene, polytetrafluoroethylene, polypentafluoropropene and polyhexafluoropropene.

9. The method of claim 7 wherein said polymer is polypropylene.

10. The method of claim 1 wherein said polymer forms a polymer bed of substantially uniform depth of about 12 inches deep, 10 inches long and about 34 inches wide and the polymer is scanned with an electron beam having a scan width of about 56 percent of said bed.

11. The method of claim 10 wherein the polymer bed is in form of a tray.

12. The method of claim 10, wherein said electron penetration into the substantially uniform depth of organic polymer is not greater than about five inches.

13. The method of claim 1 wherein the width of the radiation beam is limited to from about 50 to 60 percent of the bed width.

14. The process of claim 1 including the steps of:
    reintroducing said mixture at least once through the irradiation zone; and repeating step (c).

15. The process of claim 1 wherein the beds of organic polymer are formed in a plurality of trays which are attached to a conveyor.

16. An organic polymer powder or pellet having a continuous distribution of a decreased molecular weight with an increased melt flow prepared by the method of claim 1.

17. A method for irradiating a high molecular weight propylene polymer in flowable solid form which is capable of undergoing chain scission when subjected to radiation with high energy electrons so as to utilize more efficiently said radiation to impinge the polymer with a distinct radiation pattern to provide continuity in molecular weight distribution comprising the steps of:

(a) forming a bed of said propylene polymer in flowable solid form, said bed having a substantially uniform depth which exceeds the penetration potential of the beamed electrons and a width greater than the pattern of the radiation beam;

(b) passing said bed of said propylene polymer through a radiation zone said radiation zone having a radiation pattern narrower than the total width of said bed;

(c) irradiating said propylene polymer so that the radiation impinges only in a pattern which is less than the total width of said bed at an intensity sufficient to cause controlled chain scission of said polymer but not of sufficient intensity to penetrate the entire depth of the propylene polymer to provide irradiated and non-irradiated polymer.

(d) removing said irradiated and non-irradiated organic polymer from said radiation zone;

(e) mixing the irradiated and non-irradiated polymer; and (f) recovering propylene polymer having a decreased molecular weight with an increased melt flow rate value.

18. The process of claim 17 including the steps of:
    reintroducing said mixture at least once through the irradiation zone; and repeating step (c).

* * * * *